(12) United States Patent
Whight

(10) Patent No.: US 6,353,408 B1
(45) Date of Patent: Mar. 5, 2002

(54) ELECTRONIC NAVIGATION APPARATUS

(75) Inventor: Kenneth R. Whight, Horsham (GB)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/264,057

(22) Filed: Mar. 8, 1999

(30) Foreign Application Priority Data

Mar. 31, 1998 (GB) .............................................. 9806785
Oct. 22, 1998 (GB) .............................................. 9823045

(51) Int. Cl.[7] .............................. G01S 5/02; H04B 7/185
(52) U.S. Cl. .............................. 342/357.02; 342/357.01; 342/357.06; 342/357.12; 701/200; 701/213; 701/214
(58) Field of Search ....................... 342/357.01–357.17, 342/385–391; 701/200, 207–216

(56) References Cited

U.S. PATENT DOCUMENTS

| 4,754,283 A | | 6/1988 | Fowler ........................ 342/461 |
| 4,970,523 A | | 11/1990 | Braisted et al. ............. 342/418 |
| 5,703,597 A | * | 12/1997 | Yu et al. ................. 342/357.12 |
| 5,808,581 A | * | 9/1998 | Braisted et al. ......... 342/357.02 |
| 5,969,672 A | * | 10/1999 | Brenner ................. 342/357.06 |

* cited by examiner

*Primary Examiner*—Bernarr E. Gregory

(57) ABSTRACT

An electronic navigation apparatus having improved determination of acceleration and higher order kinematic parameters of the apparatus relative to remote transmitters. The apparatus targets multiple carrier tracking channels having different tracking loop response functions, on a remote transmitter and determines the acceleration, and optionally higher order kinematic parameters, relative to the remote transmitter by operating on the frequency outputs from each of the tracking channels.

10 Claims, 4 Drawing Sheets

ELECTRONIC NAVIGATION APPARATUS

FIELD OF THE INVENTION

The present invention relates to an electronic navigation apparatus, and further relates to a method of operating such an apparatus.

A variety of electronic navigation systems are known. All work by having a plurality of radio transmitters, each transmitting information about its respective position, this information enabling a receiver to determine its position from the received signals. Currently available systems include GPS (Global Positioning System), a US satellite-based system, and GLONASS (GLObal NAvigation Satellite System), the Russian equivalent.

Receivers for such systems are used in a variety of applications, including boats and aircraft. An increasingly popular application is in electronic guidance systems for vehicles, where the electronic navigation system is used in conjunction with an electronic map to direct the vehicle driver to their desired destination.

GPS is a widely used system and comprises a constellation of typically 24 satellites in six inclined, approximately 12-hour circular orbits around the earth. Each satellite carries extremely accurate atomic clocks, and transmits a uniquely coded spread spectrum signal on a carrier frequency centred at 1.575 GHz which provides information about the current time and location of the satellite. There are coarse and fine versions of the spread spectrum signals, the former being for civilian usage and the latter for military applications. Reception of coarse signals from four or more satellites provides sufficient information for the receiver to be able to determine its three-dimensional position on (or near) the earth's surface and the current time. The satellite orbits are arranged so that there are always at least four satellites visible at any point on the earth's surface, unless the receiver's view of the sky is blocked by buildings or other obstructions.

As well as determination of the receiver's position, derived from the time of arrival of each of the satellite signals, the receiver's velocity can be determined from the Doppler shift in the frequency of the transmission from each satellite.

The nature of the transmitted signal gives rise to random fluctuations in the apparent position and velocity of the receiver. This fluctuation is undesirable, and some filtering mechanism is generally used before the position and velocity are reported to the user of the receiver. In such a process, information about previous position and velocity of the receiver is combined with new measurements to arrive at a statistically acceptable result. This process takes into account both the confidence in the old results and the quality of the new measurements. It also enables the receivers position to be extrapolated for short periods when insufficient satellites are visible for accurate positional fixes to be made, based on the assumption of constant velocity.

Information about the acceleration of the receiver can further improve the accuracy of the filtering process and its immunity to noise. At present, such information can only be obtained from mechanical accelerometers (effectively one or more masses on springs), which cannot be conveniently combined with an integrated circuit. A discussion of how to integrate a GPS receiver and an inertial navigation system including accelerometers, indicating some of the complexities involved, is provided in "Understanding GPS: Principles and Applications", page 395, E D Kaplan, Artech House, 1996.

SUMMARY OF THE INVENTION

An object of the present invention is to improve the determination of acceleration in an electronic navigation apparatus.

According to a first aspect of the present invention there is provided an electronic navigation apparatus comprising first and second tracking channels, the first tracking channel having a carrier tracking loop arranged to track accurately the frequency of a remote transmitter as received, the second tracking channel having a tracking loop arranged to track less accurately under dynamic conditions the frequency of the remote transmitter as received, and means for combining the accurately and less accurately tracked frequencies to provide a measure of a kinematic parameter of the navigation apparatus relative to the remote transmitter.

Advantageously, to determine the order n kinematic parameter (where n=3 for acceleration, n=4 for jerk, etc) the accurate carrier tracking loop is implemented as a phase locked loop of order n, and the less accurate carrier tracking loop is implemented as a frequency locked loop of order n−2 or a phase locked loop of order n−1.

According to a second aspect of the present invention there is provided a method of operating an electronic navigation apparatus comprising first and second tracking channels, the first tracking channel having a carrier tracking loop arranged to track accurately the frequency of a remote transmitter as received, the second tracking channel having a tracking loop arranged to track less accurately under dynamic conditions the frequency of the remote transmitter as received, the method comprising combining the accurately and less accurately tracked frequencies to provide a measure of a kinematic parameter of the navigation apparatus relative to the remote transmitter.

The present invention is based upon the recognition, not present in the prior art, that targeting a plurality of carrier tracking loops having different dynamic tracking properties on a remote transmitter enables acceleration and higher order kinematic parameters to be derived.

By means of the present invention determination of acceleration and higher order kinematic parameters directly from the received transmissions by electronic circuitry is enabled.

BRIEF DESCRIPTION OF THE DRAWING

Embodiments of the present invention will now be described, by way of example, with reference to the accompanying drawings, wherein.

DETAILED DESCRIPTION OF THE PREFERRED EMBODIMENTS

Figure 1:
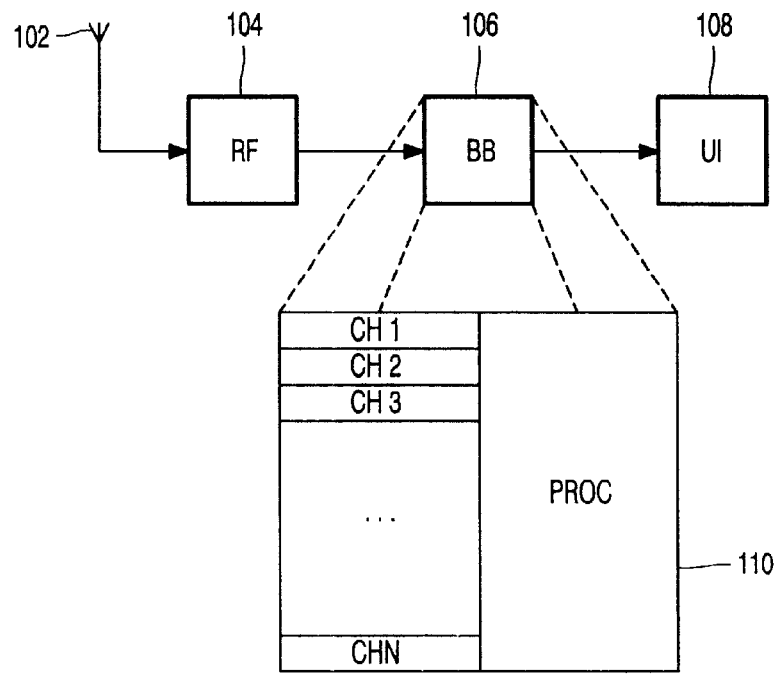
FIG. 1 is a block diagram of a typical GPS receiver.

In the drawings the same reference numerals have been used to indicate corresponding features.

Architectures for GPS and other electronic navigation systems are well known, for example as described in U.S. Pat. Nos. 4,754,465 and 4,970,523. FIG. 1 illustrates schematically one such architecture. An antenna 102 collects signals from a plurality of remote transmitters (for GPS these are right-hand circularly polarised signals on a carrier at 1.575 GHz). The received signals are fed into a Radio Frequency (RF) front end 104, comprising a comparatively simple analogue section which mixes the received signals down to a much lower Intermediate Frequency (IF).

The IF output from the RF front end 104 is fed into the baseband processing block 106. This contains the digital circuitry necessary to decode the spread spectrum signals from the different remote transmitters and process the information to calculate the position and velocity of the user. This section is normally made up of a combination of custom hardware arranged as a number of parallel channels CH1 to CHN, each capable of tracking the signal from a single remote transmitter, together with some form of embedded microprocessor or digital signal processor (PROC) 110, which controls the channels and performs the position and velocity calculations.

In known receivers, one remote transmitter is tracked by one channel. Although in principle only four channels are required, in practice it is found to be advantageous to have more. When the receiver is first switched on multiple channels may be targeted on one remote transmitter, thereby speeding up acquisition of its signal. When one of the channels has locked onto the signal from a respective remote transmitter, the remaining channels that were also attempting to lock onto that transmitter may be reallocated to attempting to track further remote transmitters. Although only four remote transmitters need to be tracked to enable the receiver to provide three dimensional position and velocity readings, tracking more remote transmitters enables the receiver to improve the accuracy of the reported position and velocity, and also provides redundancy in case reception of signals from one or more of the remote transmitters is interrupted.

The output from the baseband processing block 106 is information about the position and velocity of the receiver, which information is passed to a user interface block 108 for display.

The main function of each channel in the baseband processing block 106 is to track the signal from a respective single remote transmitter, selected on the basis of its unique spreading code. This function in turn splits into two related tasks, tracking of the transmitted carrier signal and tracking of the transmitted code.

Figure 2:
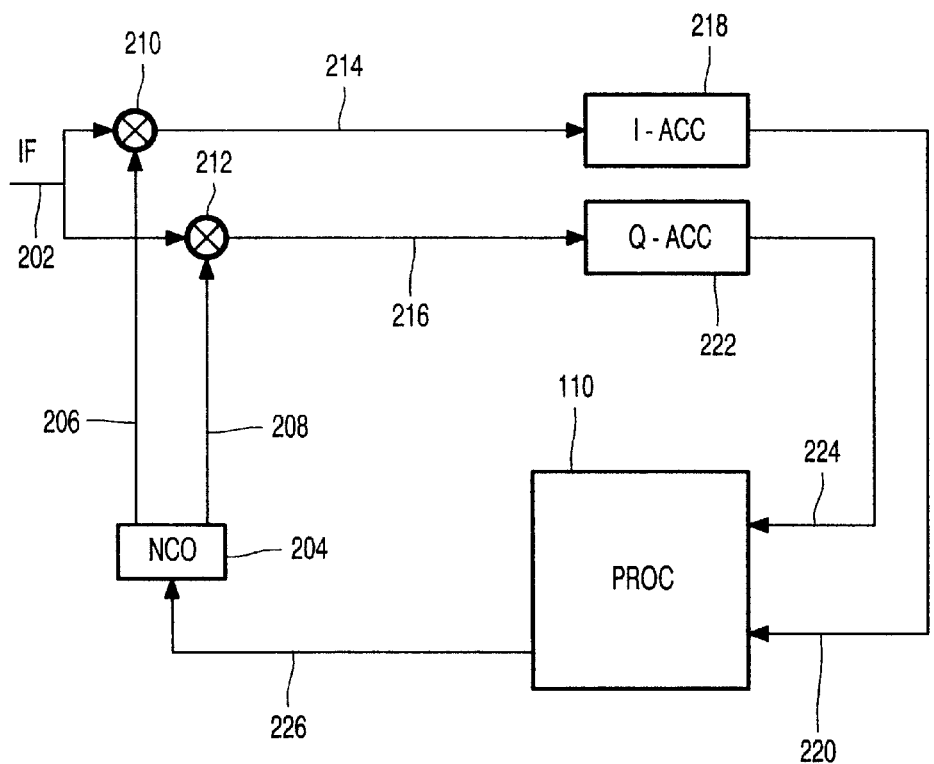
FIG. 2 is a block diagram of the parts of a channel required for carrier tracking.

FIG. 2 is a more detailed view of one of the channels showing only the components concerned with carrier tracking, the aim of which is to arrange for a locally generated signal to follow the carrier part of an incoming IF signal 202 as closely as possible. A carrier Numerically Controlled Oscillator (NCO) 204 generates the local oscillator signal, providing two outputs, 206 and 208, with a 90° phase difference between them. The incoming IF signal 202 is split into two parts, one of which is combined by a mixer 210 with the first output 206 of the carrier NCO 204 to produce a signal in an in-phase (I) channel 214, the other of which is combined by a mixer 212 with the second output 208 of the NCO 204 to produce a signal in a quadrature (Q) channel 216.

The net signal in the I channel 214 is integrated over a defined measurement period (for example 1 ms) by an I accumulator (I-ACC) 218, and the result is provided as an output 220 for access by the processor 110. Similarly, the net signal in the Q channel 216 is integrated over the same measurement period by a Q accumulator (Q-ACC) 222, and the result is provided as an output 224 for access by the processor 110. The carrier tracking loop is completed by the processor 110 providing an input 226 to the carrier NCO 204 which controls the frequency and phase of the generated signals 206, 208. Hence, both the type of loop and its responsiveness can be modified under control of the processor 110. The two basic types of loop used are:

a Frequency Locked Loop (FLL), in which the processor 110 tries to keep the frequencies of the locally generated signals 206, 208 and incoming IF signal 202 the same; and a Phase Locked Loop (PLL), in which the processor 110 tries to ensure that the locally generated signals 206, 208 remain in phase with the incoming IF signal 202. There is also a variant of the PLL known as a Costas Loop, which preserves the data modulated on the baseband signal and is therefore often used.

Although the theory of FLLs and PLLs is well known, as described for example in "Phaselock Techniques", second edition, F M Gardner, John Wiley and Sons, 1979, some of the terminology used herein differs from that used elsewhere. It is therefore useful to provide a very brief overview of the properties of such loops.

Figure 3:
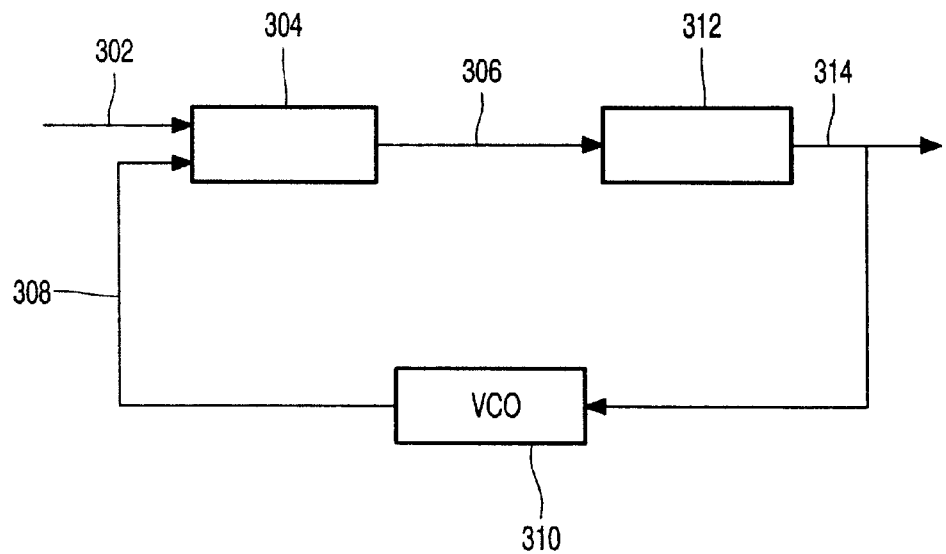
FIG. 3 is a block diagram of an idealised tracking loop

An idealised tracking loop, which can be configured as either a PLL or an FLL, is shown in FIG. 3. An input signal 302 is applied to one input of a phase comparator 304. The phase comparator generated an output signal 306 which is directly proportional to the phase difference $\Psi$ between the input signal 302 and an output signal 308 of a voltage controlled oscillator (VCO) 310. The phase comparator output signal 306 is used as the input signal for a filter 312, whose output 314 drives the VCO 310 to produce its output signal 306.

Depending on the choice of filtering function implemented in the filter 312 a variety of PLLs and FLLs can be generated. The sensitivity to dynamic behaviour of these loops is characterised by their order. Consider initially a PLL. In a first order PLL the output voltage 314 of the filter 312 is proportional to the output voltage of the phase comparator 304 (in other words the filter 312 does nothing except possibly scaling the voltage). The phase difference $\Psi(t)$ between the inputs 302, 308 to the phase comparator obeys the following differential equation:

$$\frac{d\psi}{dt} + k\psi = \omega \tag{1}$$

where $\Psi(t)$ is an arbitrary function of time, representing the change in frequency as a result of the dynamics of the GPS user, and k is a time constant for the loop which determines its sensitivity to changes in frequency.

In a second order PLL the output 314 of the filter 312 is equal to the output signal 306 from the phase comparator 304 together with an additional voltage proportional to the integral of past output voltages 306 from the phase comparator 304. The phase difference $\Psi(t)$ between the inputs 302, 308 to the phase comparator obeys the following differential equation:

$$\frac{d^2\psi}{dt^2} + C_1 \frac{d\psi}{dt} + C_o\psi = \frac{d\omega}{dt} \tag{2}$$

Such a loop is normally operated as a critically damped loop, by which is meant a loop that returns to equilibrium, after a disturbance, in the shortest time and with minimal transient excursion. For such a loop, both the exponential decay and oscillatory components of the transient behaviour of the loop have the same time constant k. A condition for a second order PLL to operate under critical damping is that the roots of the auxiliary equation are equal to $-k(1 \pm i)$. The auxiliary equation is obtained by substituting $\Psi = A e^{mt}$ into the homogeneous version of equation 2 above, to yield $$m^2 + C_1 m + C_0 = 0 \quad (3)$$

For the roots of this equation to have the required values, $C_1 = 2k^2$ and $C_0 = 2k^2$. Hence, the differential equation followed by a critically damped second order PLL is $$\frac{d^2\psi}{dt^2} + 2k \frac{d\psi}{dt} + 2k^2 \psi = \frac{d\omega}{dt} \quad (4)$$

In a third order PLL the output 314 of the filter 312 is the same as that for a second order PLL with an additional voltage proportional to the double integral of past output voltages 306 from the phase comparator 304. The phase difference $\Psi(t)$ between the inputs 302, 308 to the phase comparator obeys the following differential equation for a critically damped loop:

$$\frac{d^3\psi}{dt^3} + 3k \frac{d^2\psi}{dt^2} + 4k^2 \frac{d\psi}{dt} + 2k^3 \psi = \frac{d^2\omega}{dt^2} \quad (5)$$

In this case a condition for critical damping is that the three roots of the auxiliary equation are equal to $-k$ and $-k(1 \pm i)$.

The different orders of PLL behave differently in response to changes in signal frequency $\Psi$. A first order PLL exhibits a constant phase error when the signal frequency differs from the natural frequency of the loop, as would occur during a velocity-induced Doppler shift. A second order PLL exhibits a constant phase error under constant acceleration and, following a transient excursion, is insensitive to a velocity-induced Doppler shift. A third order PLL is insensitive to constant accelerations and exhibits a constant phase error under constant jerk (rate of change of acceleration).

For an FLL, the output 314 of the filter 312 should be related to the frequency difference between the input signals 302, 308 to the phase comparator. A suitable output is obtained by using $$T \frac{d\psi}{dt} \quad (6)$$

instead of $\Psi$ for the output 314 of the filter 312, where T is a sample period and $d\Psi/dt$ is the instantaneous error frequency. T is typically a short period such as 1 ms so that phase lock is not lost (which would happen if $T \, d\Psi/dt$ became greater than $\pi/2$). The effect of this substitution is that a second order PLL becomes a first order FLL and therefore has similar behaviour, in particular it exhibits a constant frequency error under constant acceleration.

The differential equation obeyed by a critically damped first order FLL is $$\frac{d\psi}{dt} + \alpha \psi = \frac{\omega}{1 + 2kT} \quad (7)$$

where $\alpha$ is the time constant of the first order FLL, related to its k value and to its sample period T by $$\alpha = \frac{2k^2 T}{1 + 2kT} \quad (8)$$

Returning to the carrier tracking channel shown in FIG. 2, any difference in frequency between the incoming IF signal 202 and locally generated signals 206, 208 results in a signal having a frequency equal to that difference in both the I channel 214 and Q channel 216. This signal can be used to drive a FLL. Further, the phase error of the generated signals 206, 208 can be obtained as arctan(Q/I), where Q is the signal in the Q channel 216 and I is the signal in the I channel 214. Generally, it is preferred to use a FLL for initial acquisition of a carrier signal from a remote transmitter, while using a PLL once the signal has been acquired. Further details of the theory of tracking loops may be found, for example, in "Understanding GPS: Principles and Applications", chapter 5, E D Kaplan, Artech House, 1996.

For the purposes of understanding the present invention, it is important to note that, while the carrier tracking in a channel is normally controlled to follow the incoming IF signal 202 accurately (referred to as an agile loop in this specification), the processor 110 can be arranged to produce any desired characteristics of the tracking loop. In particular, the carrier tracking may be controlled so that the rate at which the processor can change the frequency of the carrier NCO 226 is less than the rate at which the carrier frequency can change (referred to as a sluggish loop in this specification). Alternatively, a higher order loop (for example a third order PLL, not sensitive to acceleration) can be used to track the carrier frequency accurately, and a lower order loop (for example a first order FLL, sensitive to acceleration but not to velocity changes) can be used to track the carrier frequency less accurately.

Each channel comprises additional components (not shown) which are concerned with code tracking, which aims to keep a locally generated version of the code transmitted by a remote transmitter in phase with the transmitted version as closely as possible. The code tracking part of the channel will not be described as it is not relevant to an understanding of the present invention and implementations are well known, as described in U.S. Pat. No. 4,970,523 for example.

The carrier frequency received from a remote transmitter will normally be modified from that transmitted by a Doppler shift. The originally transmitted frequency is known, so the receiver can determine the frequency shift $\Delta f$ caused by the relative motion of the receiver and the remote transmitter. The component of the velocity of the receiver relative to the remote transmitter along a line between the two is then given by:

$$v = \frac{c \Delta f}{f_t} \quad (9)$$

where $f_t$ is the frequency actually transmitted and c is the speed of light. This relationship is valid as long as $v \ll c$, which will always be the case in practice. A positive shift in frequency indicates that the receiver and remote transmitter are moving towards one another, a negative shift that they are moving apart.

In practice, four satellites are required to obtain a three dimensional velocity measurement as there are four unknowns to be determined (three components of velocity and the error in the local frequency measurement). The acceleration of the receiver can be derived from the rate of change of measured velocity, but this is unsatisfactory because of random errors in the measured velocity. (It is for the same reason that it is preferred to compute velocity from Doppler shift measurements rather than from the rate of change of position.)

Figure 4:
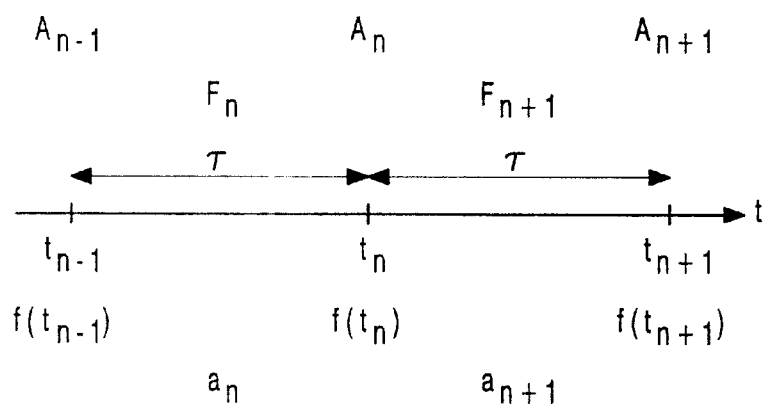
FIG. 4 is a diagram of the measurement sequence for determining acceleration.

Now consider how to compute velocity and acceleration. FIG. 4 illustrates the real and measured parameters for two consecutive measurement periods. Measured parameters are shown above the time line, real parameters below. The system measures the frequency of the received signal by counting the number of signal cycles in a measurement period, of duration $\tau$. The $n^{th}$ measurement period lasts from time $t_{n-1}$ to $t_n$, and the $n+1^{th}$ measurement period from time $t_n$ to $t_{n+1}$. The real (instantaneous) frequency at time t is denoted by f(t). The estimated frequency for the $n^{th}$ measurement period is denoted by $F_n$. If the measurement loop is accurate, this is the average frequency over the measurement period.

To simplify the mathematics, shift the time origin so that the $n^{th}$ measurement period begins at time t=0, with the result that $t_{n-1}=0$ and $t_n=\tau$. If f(t) is assumed to vary linearly with time between measurement points then in the $n^{th}$ measurement period it can be written as $$f(t)=f(0)+a_n t \quad (10)$$

where $a_n$ is a constant for the $n^{th}$ measurement period. Hence, $$f(t_n)=f(0)+a_n \tau \quad (11)$$

The estimated frequency $F_n$ is obtained by counting the signal cycles in the $n^{th}$ measurement period and dividing by the length of the period, i.e.

$$F_n = \frac{1}{\tau}\int_0^\tau f(t)dt = \frac{1}{\tau}\int_0^\tau (f(0)+a_n t)dt = f(0) + \frac{a_n \tau}{2} \quad (12)$$

Hence, for a linear variation of frequency between measurement periods, $F_n$ is the estimated frequency at the centre of the $n^{th}$ measurement period. This is equal to the actual frequency at that time if the measurement loop is sufficiently agile to track changes in the carrier frequency accurately. The estimated rate of change of frequency at time $t_n$, denoted by $A_n$ is defined as $$A_n = \frac{F_{n+1} - F_n}{\tau} \quad (13)$$

This estimate is an average of current and past rates of change (and so will tend to smooth out the reported acceleration).

The above discussion has assumed that the measurement loop can track accurately changes in frequency of the carrier signal. Consider now a loop where this is not the case, for example a critically damped loop with time constant $\alpha$, which measures the frequency as f'(t). For a first order FLL, the rate of change of f'(t) is proportional to the difference between this frequency and the real frequency f(t), and therefore $$\frac{df'(t)}{dt} = \alpha(f(t) - f'(t)) \quad (14)$$

This equation has a general solution of $$f'(t) = ke^{-\alpha t} + \alpha e^{-\alpha t}\int_0^t f(\chi)e^{\alpha \chi}d\chi \quad (15)$$

where k is a constant determined by the boundary conditions. If the acceleration is assumed to be constant in the $n^{th}$ measurement period, f(t) is given by equation 10. The resulting solution for the frequency reported by the sluggish loop, f'(t), is $$f'(t) = \left(f'(t_{n-1}) - f(t_{n-1}) + \frac{a_n}{\alpha}\right)e^{-\alpha t} + f(t) - \frac{a_n}{\alpha} \quad (16)$$

where the initial running frequency of the sluggish loop at the start of the $n^{th}$ measurement period is $f'(t_{n-1})$. The estimated frequency (derived in the same way as that for the agile loop in equation 12) is $$F_n' = \frac{1}{\tau}\int_0^\tau \left(f'(t_{n-1}) - f(t_{n-1}) + \frac{a_n}{\alpha}\right)e^{-\alpha t}dt + \frac{1}{\tau}\int_0^\tau f(t)dt \quad (17)$$

Using the formula for the estimated frequency reported by the agile loop, from equation 12, enables the difference between the estimated frequencies reported by the two loops to be written as $$F_n' - F_n = \frac{1}{\tau}\int_0^\tau \left((f'(t_{n-1}) - f(t_{n-1}))e^{-\alpha t} - \frac{a_n}{\alpha}(1-e^{-\alpha t})\right)dt \quad (18)$$

This equation can be integrated and re-arranged to yield the value of $a_n$ as $$a_n = \frac{\alpha^2 \tau(F_n' - F_n) - \alpha(f'(t_{n-1}) - f(t_{n-1}))(1-e^{-\alpha\tau})}{1 - \alpha\tau - e^{-\alpha\tau}} \quad (19)$$

If the two loops are initially set to the same state, at time $t_0$, then $f'(t_0)=f(t_0)$ and equation 19 yields $a_1$ directly. For subsequent measurement periods the frequency difference between the two loops can be determined from the known acceleration in each measurement period, using equation 16:

$$f'(t_n) - f(t_n) = (f'(t_{n-1}) - f(t_{n-1}))e^{-\alpha\tau} - \frac{a_n}{\alpha}(1-e^{-\alpha\tau}) \quad (20)$$

Hence, differencing the frequency estimates provided by the two tracking loops enables the current acceleration parameter an to be determined directly. As well as providing the acceleration more accurately than by use of equation 13 (which is an average of current and past acceleration), the result provided by this method is not affected by random errors in the measurement of velocity.

Implementations of this method may proceed by selecting an appropriate value of $\alpha$ then measuring the corresponding differences in frequencies between the loops. Alternatively the value of a used by the sluggish loop could be modified to attempt to maintain a chosen, fixed frequency difference between the two loops.

In the first case, a typical requirement for a tracking loop to function correctly is that the phase difference between the loop feedback signal and the real signal (as tracked by the agile loop) should not exceed $\pi/2$. If the agile and sluggish loops were set to the same state at t=0, after a time T the difference in phase $\Delta\Psi$ between the two loops is given by $$\Delta \psi = \int_0^T (f'(t) - f(t))dt \qquad (21)$$

From knowledge of the system dynamics, the maximum acceleration likely and the time for which it can be sustained are known. If this maximum acceleration is a and it can be sustained for time T, substituting equation 16 into equation 21 and performing the integration gives $$\Delta \psi = \frac{a}{\alpha^2}(1 - \alpha T - e^{-\alpha T}) \qquad (22)$$

Using this relationship, if a maximum acceleration of 10 m/s² can be sustained for a maximum of 10 s, an appropriate value of α is about 64/s.

The exact form of the relaxation function used in the above equations is not critical. The form of equation 14 is appropriate for representing the response of a critically damped loop. Other loop response functions may be used in practice, for example a lightly damped loop where the response to a step change in frequency is a function which oscillates about the final value with the amplitude of the oscillations decreasing exponentially. The above derivation could be carried through for any defined loop function, with equivalent results.

The above discussion has assumed that both loops are first order FLLs, one with an agile response and the other with a sluggish response. Improved and simplified operation can be obtained if the agile loop is instead a third order PLL and the time constants of both loops are arranged so that they return to equilibrium at the same rate. This is done by setting a for the FLL, in equation 7, to be the same as k in equation 5, and enables acceleration to be derived simply from the difference in frequency reported by the two loops, without the need to reference previous frequency values.

Alternatively, the first order FLL could be replaced by a second order PLL, with the time constant k set equal to that for the third order PLL. An advantage of using the first order FLL instead of the second order PLL is that the FLL is less likely to lose its lock on the signal.

Figure 5:
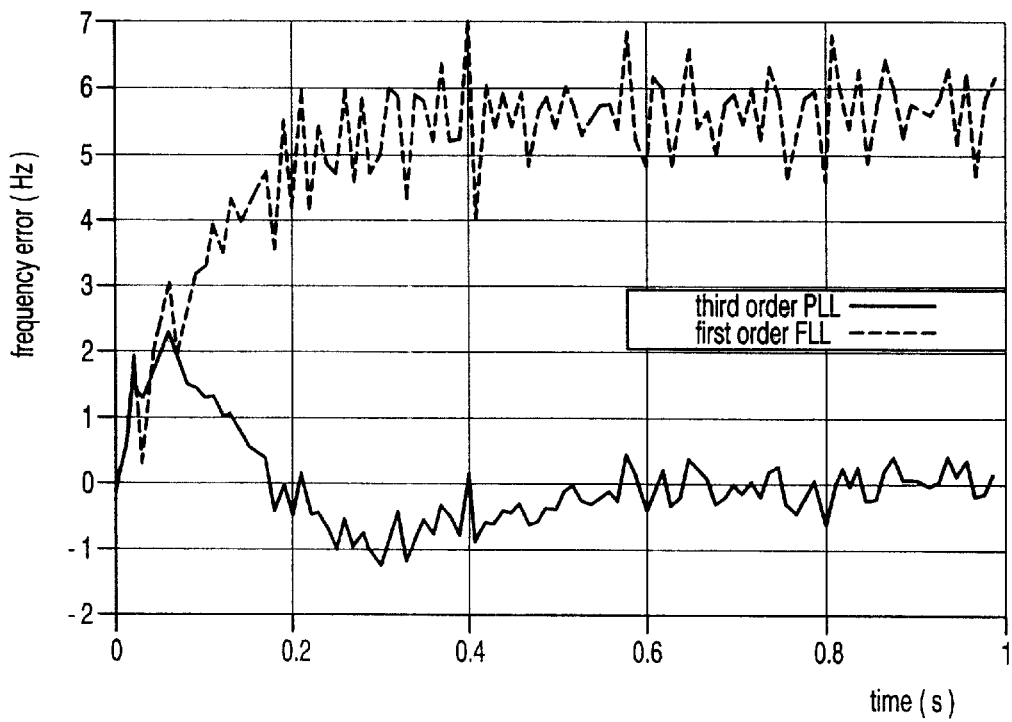
FIG. 5 is a graph of frequency error in Hz against time in seconds for different loops during constant acceleration.

FIG. 5 is a graph of frequency error in Hz against time in seconds for both first order FLL and third order PLL loops. It shows the response of the loops to a constant 15 m/s² acceleration starting at t=0, with phase noise added to the input signal. The time constant k for the third order PLL was set to k=8.7/s. As expected, the third order PLL is unaffected by the acceleration, after a brief initial error, while the first order FLL reaches a constant frequency error after a similar time.

Figure 6:
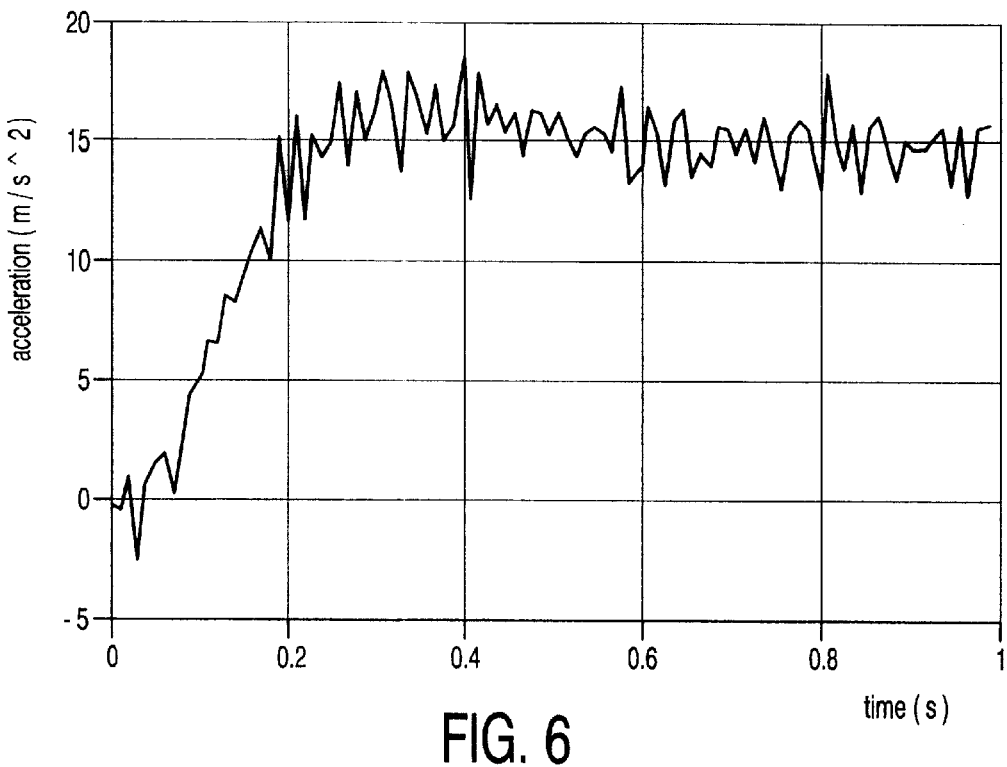
FIG. 6 is a graph of reported acceleration in m/s² against time in seconds.

FIG. 6 shows the reported acceleration, in m/s², against time in seconds, derived from subtracting the outputs of the two loops. The phase noise is, to some extent, subtracted out since it is correlated in both loops. For this value of k it should be practical to resolve accelerations of 0.25 m/s², corresponding to a 0.1 Hz frequency difference between the loops.

Figure 7:
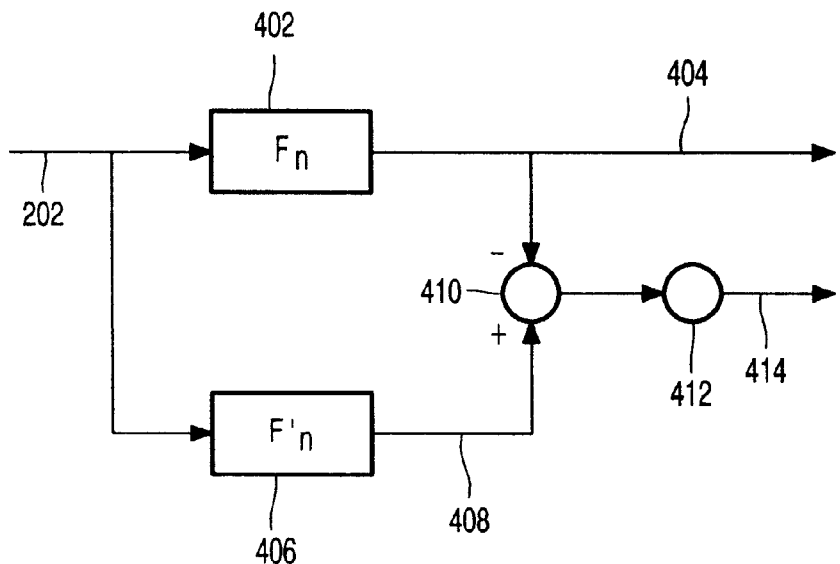
FIG. 7 is a block diagram of a system for determining acceleration.

A system for determining acceleration according to the above description is shown in FIG. 7. The input to the system is the incoming IF signal 202. An accurate tracking loop 402 comprises one of the parallel channels CH1 to CHN together with the processor 110 which controls the loop to track accurately the incoming IF signal 202 and provide the measured frequency, $F_n$, on output line 404. A less accurate tracking loop 406 comprises another one of the parallel channels CH1 to CHN together with the processor 110, which controls the loop so that it does not track the incoming IF signal accurately under dynamic conditions. Depending on the setup of the loops, the less accurate loop 406 will either lag behind changes in the signal 202 according to a known relationship, for example that given in equation 14, or will have a frequency offset proportional to the acceleration. The measured frequency from the sluggish loop, $F'_n$, is provided on output line 408.

A subtraction block 410 takes the difference of the two signals 408 and 404 (i.e. $F'_n - F_n$) and provides it to an arithmetic block 412 which processes the signal appropriately. If the system is configured as two first order FLLs the signal is processed according to equation 19, so that the constant an is provided as output 414. Alternatively, if the system is configured as a first order FLL and a third order PLL no processing is required and output 414 is equal to the instantaneous frequency difference between the loops. Hence, using the Doppler shift formula given as equation 9, output 404 can be processed to yield the velocity of the receiver, and output 414 to yield its acceleration.

Figure 8:
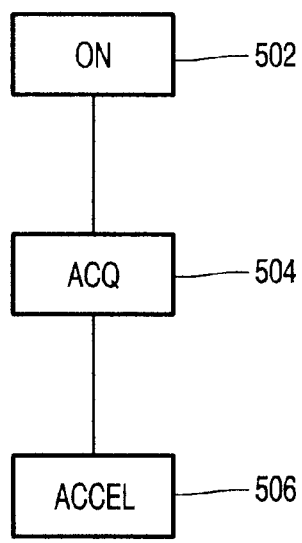
FIG. 8 is a flow chart illustrating a method of obtaining the acceleration of the receiver.

In practice, the most appropriate way to implement such a system is to take advantage of the flexibility of the receiver architecture, whereby the processor 110 controls the behaviour of the channels CH1 to CHN. FIG. 8 is a flow chart illustrating one possible method of operating the receiver. The first step 502 is to turn on the receiver, which initially enters the acquisition phase 504. Here the processor 110 directs each of the channels CH1 to CHN to a remote transmitter, and each channel attempts to track the signal from the transmitter to which it is directed. When the processor determines that sufficient signals have been acquired to obtain good positional information, it may decide to enter an acceleration measurement phase 506. Here some of the channels CH1 to CHN have their loop parameters modified to become less accurate loops 406. Each loop 406 is directed at a remote transmitter already being tracked by an accurate loop 402, and the combined output of the loops is used as described above to determine the acceleration.

If the quality of the received signals deteriorates, the processor 110 can decide that one or more of the less accurate loops 406 should be reconfigured as accurate loops 402 and directed at a currently untracked remote transmitter, to improve the quality of the positional fix. This flexibility enables maximum effort to be directed at obtaining accurate positional information when it is appropriate, while diverting channels to acceleration measurement when they can be spared.

Now consider how to obtain higher order kinematic parameters (jerk and beyond). If, instead of the linear variation of frequency with time assumed in equation 10 a quadratic variation is assumed, then in the $n^{th}$ measurement period the frequency can be written as $$f(t) = f(t_{n-1}) + a_n(t - t_{n-1}) + b_n(t - t_{n-1})^2 \qquad (23)$$

where $a_n$ and $b_n$ are constants for the $n^{th}$ measurement period. Following the procedure described above for two first order FLLs, equation 18 is modified to $$F'_n - F_n = \frac{1}{\tau} \int_0^\tau \left( (f'(t_{n-1}) - f(t_{n-1}))e^{-\alpha t} \frac{a_n}{\alpha}(1 - e^{-\alpha t}) + \frac{2b_n}{\alpha^2}\left(1 - e^{-\alpha t} - \frac{2b_n t}{\alpha}\right) \right) dt \qquad (24)$$

This equation can be integrated to yield a relationship between the accurate and less accurate loop running frequencies and the current acceleration and jerk parameters, $a_n$ and $b_n$ respectively. Since there are two unknowns ($a_n$ and $b_n$), two equations are required, which can be provided by having two less accurate loops with distinct values of $\alpha$. A suitable choice may be to have one loop with $\alpha$ determined by reference to the maximum acceleration and its duration, as described above, and a second loop with a somewhat higher value of $\alpha$.

It can be seen that additional higher order kinematic parameters could be obtained in an analogous manner, each parameter adding one term to the representation of the frequency and requiring one additional loop.

Alternatively, by having just two loops and configuring the first loop as a PLL of order n and the second loop as a FLL of order n−2 (or a PLL of order n−1), higher order dynamic parameters can be determined directly from the difference in running frequencies (or phase errors) of the loops, as was shown above for acceleration (with n=3). All that is required is for both loops to be critically damped with the same time constants, as described above in relation to acceleration. The requirement for critical damping in relation to higher order loops is satisfied by having the roots of the respective auxiliary equation equal to −k or −k (1±i).

It should also be noted that one code tracking loop can be used to drive both the PLL and FLL used for measurement of acceleration or higher order kinematic parameters. In practice there is little advantage in doing this since additional channels, each having a code tracking loop, that are used to speed up acquisition can simply be switched to acceleration measurements once all satellites are acquired.

From reading the present disclosure, other modifications will be apparent to persons skilled in the art. Such modifications may involve other features which are already known in electronic navigation apparatus and methods of operating such apparatus, and which may be used instead of or in addition to features already described herein.

What is claimed is:

1. An electronic navigation apparatus comprising:
    a first and a second tracking channel, the first tracking channel having a first tracking loop arranged to track a frequency of a remote transmitter as received, the second tracking channel having a second tracking loop arranged to track less accurately than the first tracking channel the frequency of the remote transmitter as received; and
    means for combining tracked frequencies from the first and second tracking channels to provide a measure of a kinematic parameter of the navigation apparatus relative to the remote transmitter.

2. An electronic navigation apparatus as claimed in claim 1, wherein the first tracking loop is a phase locked loop of order n, the second tracking loop is a frequency locked loop of order n−2, and the kinematic parameter is of order n.

3. An electronic navigation apparatus as claimed in claim 1, wherein the first tracking loop is a phase locked loop of order n, the second tracking loop is a phase locked loop of order n−1, and the kinematic parameter is of order n.

4. An electronic navigation apparatus as claimed in claim 1, wherein said means for combining is provided for dynamic selection of a loop response function of the first or second tracking loop depending on a task assigned to the first or second tracking loop.

5. An electronic navigation apparatus as claimed in claim 1, wherein said means for combining is provided for dynamically assigning one or more tracking channels to tracking the frequency of a different remote transmitter as received.

6. A method of operating an electronic navigation apparatus including first and second tracking channels, the first tracking channel having a first tracking loop arranged to track a frequency of a remote transmitter as received, the second tracking channel having a second tracking loop arranged to track less accurately than the first tracking channel the frequency of the remote transmitter as received, the method comprising the steps of:
    combining the tracked frequencies of the first and the second tracking channels; and
    providing a measure of a kinematic parameter of the navigation apparatus relative to the remote transmitter.

7. A method as claimed in claim 6, wherein the first tracking loop is a phase locked loop of order n and the second tracking loop is a frequency locked loop of order n−2, and the kinematic parameter is of order n.

8. A method as claimed in claim 6, wherein the first tracking loop is a phase locked loop of order n and the second tracking loop is a frequency locked loop of order n−2, and the kinematic parameter is of order n.

9. A method as claimed in claim 6, further comprising selecting a loop response function for the first or second tracking loop appropriate for a task assigned to the first or second loop.

10. A method as claimed in claim 6, further comprising assigning one or more tracking channels to tracking a frequency of a different remote transmitter as received.

* * * * *